(12) United States Patent
Tatsumi et al.

(10) Patent No.: US 7,615,315 B2
(45) Date of Patent: Nov. 10, 2009

(54) POSITIVE ELECTRODE MATERIAL FOR LITHIUM SECONDARY CELL AND PROCESS FOR PRODUCING THE SAME

(75) Inventors: Koji Tatsumi, Chigasaki (JP); Toshiaki Abe, Chigasaki (JP); Naoshi Saito, Chigasaki (JP); Manabu Suhara, Chigasaki (JP)

(73) Assignee: Seimi Chemical Co., Ltd., Chigasaki-shi, Kanagawa-ken (JP)

( * ) Notice: Subject to any disclaimer, the term of this patent is extended or adjusted under 35 U.S.C. 154(b) by 775 days.

(21) Appl. No.: 10/546,806

(22) PCT Filed: Aug. 16, 2004

(86) PCT No.: PCT/JP2004/011748

§ 371 (c)(1),
(2), (4) Date: Aug. 25, 2005

(87) PCT Pub. No.: WO2005/018027

PCT Pub. Date: Feb. 24, 2005

(65) Prior Publication Data

US 2006/0222951 A1  Oct. 5, 2006

(30) Foreign Application Priority Data

Aug. 19, 2003 (JP) .............................. 2003-295171

(51) Int. Cl.
*H01M 4/58* (2006.01)
*H01M 4/02* (2006.01)

(52) U.S. Cl. .............................. 429/231.95; 429/231.3; 429/231.6; 423/594.6; 423/464

(58) Field of Classification Search .............. 429/231.3, 429/231.6, 231.95; 423/594.6, 464
See application file for complete search history.

(56) References Cited

U.S. PATENT DOCUMENTS

| 6,579,475 | B2 * | 6/2003 | Gao et al. ................ 252/521.2 |
| 6,617,073 | B1 * | 9/2003 | Matsumoto et al. ...... 429/231.3 |
| 6,805,996 | B2 * | 10/2004 | Hosoya ........................ 429/94 |
| 2002/0110736 | A1 * | 8/2002 | Kweon et al. ............ 429/231.1 |

FOREIGN PATENT DOCUMENTS

| JP | 7-29603 A | | 1/1995 |
| JP | 10 1316 A | | 1/1998 |
| JP | 11-317230 A | | 11/1999 |
| JP | 2000-11993 A | | 1/2000 |
| JP | 2000268821 A | * | 9/2000 |
| JP | 2002-231246 A | | 8/2002 |
| JP | 2002-246027 A | | 8/2002 |
| JP | 2003-331843 A | | 11/2003 |

* cited by examiner

*Primary Examiner*—Gregg Cantelmo
(74) *Attorney, Agent, or Firm*—Manabu Kanesaka

(57) ABSTRACT

A positive electrode material for a lithium secondary battery for high voltage high capacity use exhibiting high cycle durability and high safety. The positive electrode material is composed of particles having a composition represented by the general formula: $Li_aCo_bMg_cA_dO_eF_f$ (A is the group 6 transition element or the group 14 element, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$ and $0.0001 \leq c+d \leq 0.03$), and magnesium, the element A and fluorine exist uniformly in the vicinity of the surfaces of the particles.

10 Claims, 1 Drawing Sheet

POSITIVE ELECTRODE MATERIAL FOR LITHIUM SECONDARY CELL AND PROCESS FOR PRODUCING THE SAME

RELATED APPLICATIONS

The present application is based on International Application No. PCT/JP2004/011748 filed Aug. 16, 2004, and claims priority from, Japanese Application Number 2003-295171 filed Aug. 19, 2003, respectively, the disclosure of which is hereby incorporated by reference herein in its entirety.

TECHNICAL FIELD

The present invention relates to a positive electrode material for a lithium secondary battery that exerts high-capacity and high-cycle characteristics particularly in the use at high voltages, and a method for manufacturing the same.

BACKGROUND ART

In recent years, with the progress of various portable and cordless electronic appliances, demands for small and light nonaqueous electrolyte secondary batteries having high energy density have been increased, and the development of a positive electrode material for a nonaqueous electrolyte secondary battery has been desired than ever before.

As the material of a positive electrode for a nonaqueous electrolyte secondary battery, $LiCoO_2$, $LiNiO_2$, $LiMn_2O_4$ or the like has been used, and especially, $LiCoO_2$ is used in a large quantity from the aspects of safety, capacity and the like. In this material, lithium in the crystal lattice is released into an electrolyte solution as lithium ions with charging, and the lithium ions are reversibly inserted into the crystal lattice from the electrolyte solution with discharging, to exert the functions as a positive electrode active material.

Theoretically, one lithium ion can be released from and inserted into one $LiCoO_2$ lattice. Actually, however, if most of lithium is released or inserted, $LiCoO_2$ is significantly deteriorated causing damage especially to cyclic performance. Therefore, in the present situation, about 0.55 lithium ions are released from and inserted into one $LiCoO_2$, and at this time, the capacity of only about 150 mAh is used for 1 g of $LiCoO_2$.

Although the expansion of the capacity can be expected by releasing and inserting larger quantities of lithium ions, if more lithium ions than the present quantities are released and inserted, there are problems that intense deterioration of $LiCoO_2$ occurs and sufficient cyclic performance cannot be secured by the phase transition of the $LiCoO_2$ crystal lattice, accompanying damage of particles and crystal lattice, or the elution of cobalt ions from the crystal lattice.

Although there has been an attempt to improve the cyclic durability at 4.5 V by doping 5% by weight of zirconium into $LiCoO_2$, the initial capacity lowers significantly, and cyclic durability is also not satisfactory (refer to Non-Patent Document 1 described below).

[Non-Patent Document 1]: Z. Chen, J. R. Dahn, 11th International Meeting of Lithium Battery Jun. 23-28, 2002, Monterey, USA, Abstract No. 266

DISCLOSURE OF THE INVENTION

PROBLEMS TO BE SOLVED BY THE INVENTION

Therefore, an object of the present invention is to provide a positive electrode material for a lithium secondary battery for high voltages that excels in the prevention of deterioration due to high voltages, and excels in high capacity, high safety and cyclic durability.

MEANS FOR SOLVING THE PROBLEMS

As a result of repeated keen studies to solve the above-described problems, the present inventors found that by simultaneously adding a specific amount of magnesium (Mg) and a specific metal element to a particulate positive electrode active material mainly composed of lithium cobaltate for a lithium secondary battery, or by further simultaneously added fluorine, favorable cyclic performance could be achieved even in a high-voltage region, which was conventionally deemed to be overcharged.

In the present invention, high voltages mean voltages wherein a charging voltage is 4.4 V or higher with reference to the lithium battery electrode. Further, a specific example of the charging voltage is 4.5 V. At this time, the capacity of about 185 to 190 mAh can be used in 1 g of $LoCoO_2$, which is equivalent to the release and insertion of about 0.7 lithium atoms per $LoCoO_2$ molecule.

In the present invention, although the mechanism why favorable cyclic performance is developed is not necessarily clear in a high-voltage region, it is considered that since magnesium and a specific metal element are simultaneously added, and these are present on the surface of a particle, or a part of these forms a solid solution, these act as a support of the crystal lattice under a high-voltage condition wherein most lithium ions are extracted; and these relaxes the strain of the crystal lattice accompanying phase transition or expansion and shrinkage, and suppress deterioration. At the same time, it is considered that since the chance of direct contact of cobalt atoms with the electrolyte is reduced, and overcharged state locally occurring in particles is eliminated, deterioration can be suppressed.

Thus, the positive electrode material for a lithium secondary battery of the present invention is characterized in that an active material for a positive electrode consists of particle having the composition represented by a general formula, $Li_aCo_bMg_cA_dO_eF_f$ (A is the group 6 transition element or the group 14 element, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$ and $0.0001 \leq c+d \leq 0.03$) wherein magnesium, the element A, or further fluorine are evenly present in the vicinity of the surface of the particle.

In the present invention, the term "evenly present" includes not only the case wherein each of the above-described elements is substantially evenly present in the vicinity of the particle surface, but also the case wherein the quantities of the above-described elements present between particles are substantially identical, and it is sufficient if either one is satisfied, and it is especially preferable that both of them are satisfied. In other words, it is especially preferable that quantities of the above-described elements present between particles are substantially identical, and the above-described elements are evenly present on the surface of a particle.

In the present invention, it is preferable that at least a part of magnesium or an element represented by A substitutes cobalt atom in the particles, and forms a solid solution. It is more preferable that the atomic ratio of magnesium to the element A is $0.10 \leq c/d \leq 10.00$, and $0.0002 \leq c+d \leq 0.02$.

In the present invention, the element A is selected from group 6 transition elements or group 14 elements. It is considered that magnesium substitutes mainly a lithium site. The element A is preferably tungsten or silicon.

The present invention provides a positive electrode material for a lithium, secondary battery characterized in that the element A is tungsten, and no diffraction peaks are observed within the rang of 2θ=21±1° in the high-sensitivity X-ray diffraction spectrum using Cu—Kα. If silicon is used for the element A, an identical positive electrode material for the lithium second battery can be obtained.

In the present invention, the high-sensitivity X-ray diffraction spectrum means a diffraction spectrum obtained at an accelerating voltage of the X-ray tube of 50 kV and an accelerating current of 250 mA. Ordinary X-ray diffraction spectrum is obtained at an accelerating voltage of about 40 kV and an accelerating current of about 40 mA, which is difficult to accurately detect a trace amount of impurity phase noticed by the present invention and significantly affecting battery characteristics in a short time while suppressing analysis noise.

Here, the bonding state of the element A, cobalt atoms, lithium atoms and oxygen atoms can be determined by the high-sensitivity X-ray diffraction spectrum. For example, when the element A is tungsten, which forms a solid solution with cobalt atoms, since no diffraction spectra derived from the single oxide of tungsten ($WO_3$) are observed, the diffraction spectrum intensity of the single oxide of the element A can be measured to calculate the solid dissolution quantity of the element A. The element A substitutes the cobalt site to form a solid solution, the solid dissolution quantity thereof is preferably 60% or more, and more preferably 75% or more.

The present inventors found that the battery performance was improved when the quantity of the element A present as a single oxide was small. Therefore, the present invention provides a positive electrode material for a lithium secondary battery characterized in that the quantity of the element A present as a single oxide is 20% or smaller. The quantity of the single oxide of the element A exceeding 20% is not preferable because the effect of improving charge-discharge cyclic durability at high voltages is lowered. The quantity of the single oxide of the element A is more preferably 10% or smaller.

The present inventors found that the charge-discharge cyclic durability at high voltages of the positive electrode material having a specific structure obtained by selecting tungsten as the element A, allowing magnesium to co-exist, and manufactured by a specific method was markedly improved.

Here, specifically, it is important in the specific structure that added tungsten is not present on the surface of the particle of lithium cobaltate as a single oxide. For this purpose, the present inventors found to be particularly preferable that magnesium was added to tungsten in the above-described specific atomic ratios ($0.10 \leq c/d \leq 10.00$, and $0.002 \leq c+d \leq 0.02$.), and lithium cobaltate was formed in the coexistence of a tungsten compound and a magnesium compound. Specifically, the present inventors found that the coexistence of magnesium had a significant effect to raise the reactivity of tungsten. It was also found that the presence of magnesium had an effect to lower the $Co_3O_4$ content in the formed lithium cobaltate.

Although the action mechanism for the unique improvement of characteristics obtained by the simultaneous addition of tungsten and magnesium has not be clarified, it is estimated that a uniform inactive film is formed on the surface of lithium cobaltate particles by the simultaneous addition of tungsten and magnesium, and the decay of crystals from the surfaces of the particles accompanying the charging and discharging of the lithium cobaltate crystal structure can be suppressed.

Although it was described that a specific improvement of characteristics was observed by the addition of magnesium at the same time when tungsten or silicon was used as the element A, the combination of such elements is not limited to this combination, but the coexistence of a specific quantity of magnesium in the combination of another element A is also effective to improve the characteristics as the positive electrode material for a lithium secondary battery, because it raises the reactivity of the element A and suppresses the formation of a single oxide.

The present invention also provides a positive electrode material for a lithium secondary battery wherein the positive electrode active material is a secondary particle wherein 10 or more primary particles are aggregated, and the average particle diameter of the secondary particles are 2 to 20 μm. By using such a secondary particle structure of an aggregated body, the packing density of the active material for the electrode layer and large current charge-discharge performance can be improved.

Furthermore, the present invention provides a method for manufacturing a positive electrode material for a lithium secondary battery characterized in that an active material for a positive electrode consists of particles having the composition represented by a general formula, $Li_aCo_bMg_cA_dO_eF_f$ (A is the group 6 transition element or the group 14 element, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$ and $0.0001 \leq c+d \leq 0.03$) wherein magnesium, the element A, or further fluorine is evenly present in the vicinity of the surface of the particles, and a cobalt material consisting of particles wherein 10 or more primary particles aggregate to form secondary particles and containing at least either cobalt oxyhydroxide or cobalt hydroxide, lithium carbonate, and a material containing magnesium, the element A or further fluorine are mixed and fired.

EFFECT OF THE INVENTION

According to the present invention, there is provided a positive electrode material for a lithium secondary battery having high cyclic durability and high safety in high-voltage and high-capacity uses useful for the lithium secondary battery. The lithium cobaltate positive electrode of this invention is useful since it has high charge-discharge cyclic performance not only in a high-voltage use, but also in the case wherein it is used for a positive electrode for a normal lithium-ion battery of 4.2-V to 4.3-V classes.

BEST MODE FOR CARRYING OUT THE INVENTION

Figure 1:
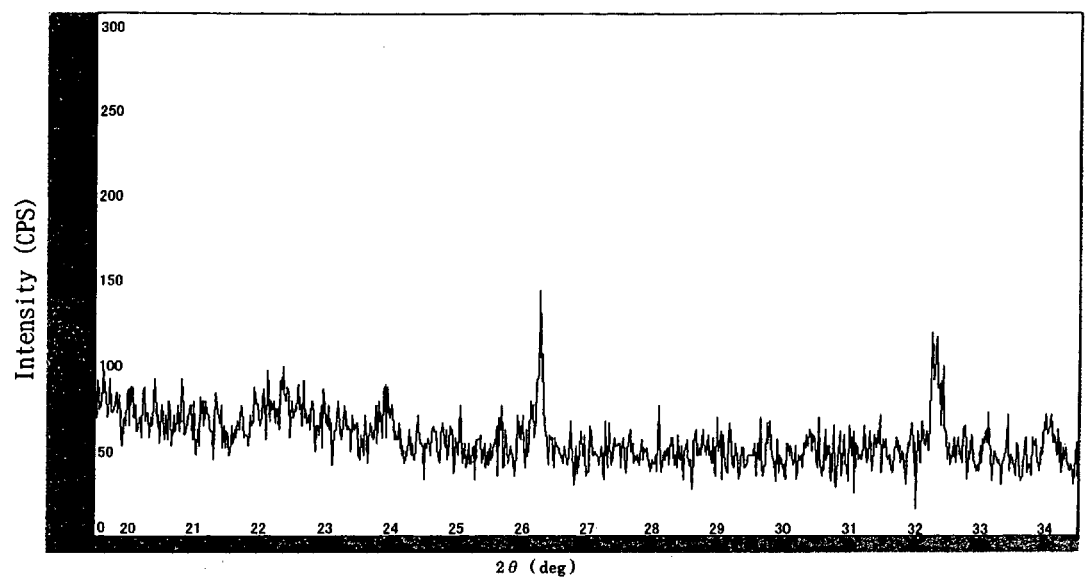
FIG. 1 is X-ray diffraction spectra of the powder of the positive electrode material obtained in Example 1 of the present invention.

In the present invention, the particulate active material of the positive electrode for a lithium secondary battery has a composition represented by a general formula, $Li_aCo_bMg_cA_dO_eF_f$. In this general formula, a is 0.90 to 1.10, b is 0.97 to 1.00, c is 0.0001 to 0.03, d is 0.0001 to 0.03, e is 1.98 to 2.02, f is 0 to 0.02 and c+d is 0.0001 to 0.03. The element A is at least an element that belongs to the group 6 element or the group 14 element, such as chromium (Cr), molybdenum (Mo), tungsten (W), silicon (Si), tin (Sn) and lead (Pb), among which tungsten and silicon are preferred from the aspect of performance.

In the present invention, the shape of the particle of the active material for the positive electrode is preferably spherical, and as the size thereof, the average particle diameter is preferably 2 to 20 µm, more preferably 3 to 15 µm. The average particle diameter smaller than 2 µm is not preferable because the formation of a dense electrode layer becomes difficult; and on the contrary, the average particle diameter that exceeds 20 µm is not preferable because the formation of a flat surface of the electrode layer becomes difficult.

The above-described active material for the positive electrode is formed of secondary particles wherein preferably 5 or more particles, more preferably 10 or more particles are aggregated, and thereby the packing density of the active material for the electrode layer can be improved, and large current charge-discharge performance can also be improved.

In the present invention, magnesium, the above-described element A, or fluorine (F) must be substantially evenly present on the surface of the particle of the particulate active material for the positive electrode. The presence of these atoms inside the particles is not only useless, but also a large quantity of these atoms must be added to be present inside, and then, since it rather causes the lowering of initial capacity, the lowering of large current charge-discharge performance or the like, it is preferable to make the atoms be present on the surface of the particle by the small quantity of addition. Among these, magnesium and the element A are present preferably within 100 nm, more preferably within 30 nm from the surface of the particle.

A part of magnesium and the element A present on the surface of the particles of the above-described particulate active material for the positive electrode is preferably a solid solution wherein cobalt atoms inside the particle are substituted. A part of fluorine is preferably a solid solution wherein oxygen atoms inside the particle are substituted. These cases are preferable, because cobalt and oxygen atoms are not exposed on the surface of the particles of the active material for the positive electrode, and the effect of the added elements is more significantly manifested. As a result, the cyclic properties as the active material for the positive electrode for high voltages can be effectively improved. The addition of fluorine atoms is preferable because it has the effect of improving the safety and cyclic performance of the battery.

It was found that the atomic ratios of magnesium atoms, element A atoms contained in the particulate active material for the positive electrode of the present invention, and cobalt atoms (c/b and d/b) were required to be 0.0001 to 0.02 each, these must be simultaneously added, and the atomic ratio of the total quantity of magnesium atoms and element A atoms to cobalt atoms ((c+d)/b) was required to be 0.0001 to 0.02.

Each of such magnesium atom ratio and element A atom ratio smaller than 0.0001 is not preferable, because the effect of improving high cyclic performance is reduced. On the other hand, the atomic ratio of the total quantity of magnesium atoms and element A atoms exceeding 0.02 is not preferable, because the initial capacity is significantly lowered.

The atomic ratio of fluorine atoms to cobalt atoms is preferably 0.0001 to 0.02, more preferably 0.0005 to 0.008, for the improvement of safety and cyclic performance. The atomic ratio of fluorine atoms exceeding these values is not preferable, because the discharge capacity is markedly lowered.

Furthermore, it is preferable that the particulate active material for a positive electrode of the present invention has a press density of 2.7 to 3.3 g/cm$^3$. The press density lower than 2.7 g/cm$^3$ is not preferable, because the initial volume capacity density of the positive electrode is lowered when a positive electrode sheet is formed using the particulate active material for a positive electrode; and on the contrary, the press density higher than 3.3 g/cm$^3$ is also not preferable, because the initial weight capacity density of the positive electrode is lowered, or high-rate discharging characteristics are lowered. Particularly, the press density of the particulate active material for a positive electrode is preferably 2.9 to 3.2 g/cm$^3$.

In the present invention, since the press density can be raised, it is preferable to use substantially spherical cobalt oxyhydroxide wherein a large number of primary particles aggregate to form a secondary particle, as the cobalt source. The press density used herein means the value obtained from the volume and weight of the powder when the powder is pressed under a pressure of 0.32 t/cm$^2$.

In the present invention, the specific surface area of the particulate active material for a positive electrode is preferably 0.2 to 1.2 m$^2$. If the specific surface area is smaller than 0.2 m$^2$/g, the discharge capacity per initial unit weight lowers; and on the contrary, if it exceeds 1.2 m$^2$/g, the discharge capacity per initial unit weight also lowers; and an excellent active material for a positive electrode, which is the object of the present invention, cannot be obtained. Particularly, the specific surface area is preferably 0.3 to 1.0 m$^2$/g.

The methods for manufacturing the particulate active material for a positive electrode of the present invention are not necessarily limited, but various known methods can be used. For example, as a cobalt source, cobalt hydroxide, tricobalt tetraoxide, or cobalt oxyhydroxide is used, and particularly, cobalt oxyhydroxide and cobalt hydroxide are preferable, because these exert high battery performance. Also as a cobalt source, a cobalt material consisting of particles wherein 10 or more primary particles aggregate to form secondary particles, and containing at least either cobalt oxyhydroxide or cobalt hydroxide is preferable, because high battery performance can be obtained.

As the materials for magnesium and element A, oxides, hydroxides, chlorides, nitrates, organic acid salts, oxyhydroxides, or fluorides are used, and particularly, hydroxides, oxides, or fluorides are preferable, because these exert high battery performance easily. As the material for lithium, lithium carbonate or lithium hydroxide is preferable. As the material for fluorine, lithium fluoride, aluminum fluoride, or magnesium fluoride is preferable.

The particulate active material for a positive electrode according to the present invention is manufactured by firing the mixture of these materials, preferably, the mixture of at least one that can be selected from oxides containing magnesium or element A, or hydroxides containing magnesium or element A, lithium fluoride, cobalt hydroxide, cobalt oxyhydroxide or cobalt oxide and lithium carbonate in an oxygen-containing atmosphere at 600 to 1050° C., preferably at 850 to 1000° C. for 4 to 48 hours, preferably 8 to 20 hours to convert it to a composite oxide. A favorable battery performance can be obtained when a fluoride containing magnesium or element A is used in place of a compound containing magnesium or element A and lithium fluoride.

As the oxygen-containing atmosphere, an oxygen-containing atmosphere wherein the oxygen concentration is preferably 10% by volume or higher, more preferably 40% by volume or higher is preferably used. Such a composite oxide can satisfy the above-described present invention by changing the kind, the mixed composition and the firing conditions of the above-described materials. In the present invention, preliminary firing can be performed before the above-described firing. The preliminary firing is preferably performed in an oxidizing atmosphere at preferably 450 to 550° C. for preferably 4 to 20 hours.

The method for manufacturing the active material for a positive electrode of the present invention is not limited to the above-described method, but for example, it can be manufactured by synthesizing an active material for a positive electrode using a metal fluoride, an oxide and/or a hydroxide as materials, and surface-treating using a fluorination agent, such as fluorine gas, $NF_3$, and HF.

The method for obtaining a positive electrode for a lithium secondary battery from the positive electrode material of the present invention can be conducted in accordance with ordinary methods. For example, a combined agent for the positive electrode can be prepared by mixing a carbon-based conductive material, such as acetylene black, graphite and ketjen black, and a binder to the powder of the active material for a positive electrode of the present invention. As the binder, polyvinylidenefluoride, polytetrafluoroethylene, polyamide, carboxymethylcellulose, acrylic resins or the like is used. A slurry wherein the above-described combined agent for the positive electrode is dispersed in a dispersant, such as N-methyl pyrrolidone is applied onto the positive electrode collector, such as an aluminum foil, dried and roll-pressed to form an active material layer for a positive electrode on the positive electrode collector.

Concerning the lithium battery using the positive electrode material of the present invention as the positive electrode, a carbonate ester is preferable as a solvent of the electrolyte solution. Either cyclic or chain carbonate ester can be used. The examples of cyclic carbonate esters include propylene carbonate, ethylene carbonate (EC) and the like. The examples of chain carbonate esters include dimethyl carbonate, diethyl carbonate (DEC), ethyl methyl carbonate, methyl propyl carbonate, methyl isopropyl carbonate, and the like.

The above-described carbonate esters can be used alone or in combination of two or more. They can also be used in combination with other solvents. In some active materials for the negative electrode, discharging characteristics, cyclic durability, and the charge-discharge effect can be improved by using a chain carbonate ester and a cyclic carbonate ester in combination. Alternatively, a gel polymer electrolyte can be prepared by adding a vinylidene fluoride-hexafluoropropylene copolymer (e.g., Kynar manufactured by Atochem) and a vinylidene fluoride-perfluoropropyl vinyl ether copolymer to these organic solvents, and adding the following solute.

As the solute of the electrolyte solution, any one or more of lithium salts containing $ClO_4-$, $CF_3SO_3-$, $BF_4-$ $PF_6-$, $AsF_6-$, $SbF_6-$, $CF_3CO_2-$, $(CF_3SO_2)_2N-$ or the like as anions are preferably used. It is preferable that the above-described electrolyte solution or polymer electrolyte are obtained by adding a lithium salt to the above-described solvent or solvent-containing polymer in the concentration of 0.2 to 2.0 mol/L. If the concentration deviates from this range, ion conductivity is lowered, and the electrical conductivity of the electrolyte is lowered. More preferably, 0.5 to 1.5 mol/L is selected. As the separator, a porous polyethylene or porous polypropylene film is used.

The negative electrode active material for a lithium battery using the positive material of the present invention as the positive electrode thereof is a material that can occlude and release lithium ions. Although materials for forming the negative electrode active material are not specifically limited, the examples of such materials include metallic lithium, lithium alloys, carbon materials, oxide based on metals of groups 14 and 15 in the periodic table, carbon compounds silicon carbide compounds, silicon oxide compounds, titanium sulfide and boron carbide compounds.

As carbon materials, thermally decomposed organic materials under various thermal decomposition conditions, artificial graphite, natural graphite, soil graphite, expanded graphite, flake graphite or the like can be used. As oxides, compounds based on tin oxide can be used. As the negative electrode collector, copper foil, nickel foil or the like can be used. The type of the lithium secondary battery using the positive electrode material in the present invention is not specifically limited. Sheet type (i.e., film type), folded type, wound cylinders with bottoms, button type or the like are selected for usage.

EXAMPLES

Example 1

Predetermined quantities of cobalt oxyhydroxide powder, wherein 50 or more primary particles were aggregated to form secondary particles, of an average particle diameter D50 of 10.2 μm, lithium carbonate powder, magnesium hydroxide powder, and tungsten oxide powder were mixed. After dry-mixing these four kinds of powders, the mixture was fired in the air at 950° C. for 14 hours. As a result of wet-dissolution of the fired powder, and the measurement of the contents of cobalt, magnesium, tungsten and lithium by ICP and atomic absorption spectrometry, the composition of the powder was $LiCo_{0.99}Mg_{0.005}W_{0.005}O_2$.

The specific surface area of the fired powder (active material powder for the positive electrode) measured by a nitrogen adsorption method was 0.40 $m^2/g$, and the average particle diameter D50 measured by a laser scattering type particle size distribution analyzer was 14.0 μm. As a result of XPS analysis of the surface of the powder after firing, a strong signal of Mg2P caused by magnesium and a strong signal of W4P caused by tungsten were detected.

When XPS analysis was performed after sputtering the powder for 10 minutes, the signals of magnesium and tungsten by XPS were attenuated to 10% and 13% of the signals before sputtering, respectively. This sputtering is equivalent to surface etching of a depth of about 30 nm. It was known from this that magnesium and tungsten were present on the surface of the particle. As a result of observation through SEM (scanning electron microscope), 10 or more primary particles were aggregated to form a secondary particle in the obtained active material powder for the positive electrode.

By a high-sensitivity X-ray diffraction method using a Model RINT2 500 X-ray diffraction apparatus with Cu—Kα manufactured by Rigaku Corporation, X-ray diffraction spectra of the powder after firing were obtained under conditions of an accelerating voltage of 50 kV, and accelerating current of 250 mA, a scanning rate of 1°/min, a step angle of 0.02°, a divergence slit of 1°, a scattering slit of 1°, a light receiving slit of 0.3 mm, and in the presence of monochromatization The obtained spectrum is shown in FIG. 1. From FIG. 1, no diffraction spectrum was observed within the range of $2\theta=21\pm1°$, and it was found that tungsten was not present as a single oxide.

Thus obtained $LiCo_{0.99}Mg_{0.005}W_{0.005}O_2$ powder, acetylene black, and polytetrafluoroethylene powder were mixed in a weight ratio of 80/16/4, kneaded while adding toluene, and dried to fabricate a positive electrode plate of a thickness of 150 μm.

Then, a model sealed battery made from stainless-steel was assembled in an argon glove box using an aluminum foil of a thickness of 20 μm as the positive electrode collector, using a porous polypropylene of a thickness of 25 μm as a separator using a metallic lithium foil of a thickness of 500 μm as the negative electrode, using a nickel foil of a thickness of 20 μm as the negative electrode collector, and using 1MliPF$_5$/EC+DEC (1:1) as the electrolyte.

This battery was first charged to 4.5 V at a load current of 75 mA per gram of the active material for the positive electrode at 25° C., and discharged to 2.75 V at a load current of 75 mA per gram of the active material for the positive electrode to obtain the initial discharge capacity. Further, charge-discharge cycle tests were repeated 50 times.

The initial discharge capacity at 25° C., 2.75 to 4.5 V, and a discharge rate of 0.5 C was 190.2 mAh/g, and the average voltage was 4.03 V. The capacity retention after 50 charge-discharge cycles was 93.5%.

Another similar battery was fabricated. After this battery was charged at 4.3 V for 10 hours, the battery was disassembled in an argon glove box. Thereafter the positive electrode body sheet after being charged was taken out, punched to a diameter of 3 mm after washing, sealed in an aluminum capsule together with EC, and heated at a rate of 5° C./min with a scanning differential calorimeter to measure heat generation starting temperature. As a result, the heat generation starting temperature of the 4.3-V charged product was 165° C.

Example 2

An active material for a positive electrode was synthesized in the same manner as in Example 1 except that predetermined quantities of cobalt oxyhydroxide powder, wherein 50 or more primary particles were aggregated to form secondary particles, of an average particle diameter D50 of 10.7 μm, lithium carbonate powder, magnesium hydroxide powder, tungsten oxide powder, and lithium fluoride powder were mixed, and composition analysis, property measurement, and battery performance test were conducted. As a result, the composition was LiCo$_{0.99}$Mg$_{0.005}$W$_{0.005}$O$_{1.9924}$F$_{0.0076}$.

The specific surface area of the powder after firing measured by a nitrogen adsorption method was 0.31 m$^2$/g, and the average particle diameter D50 measured by a laser scattering type particle size distribution analyzer was 14.5 μm. Magnesium, tungsten and fluorine were present on the surface. As a result of observation through SEM, 10 or more primary particles were aggregated to form secondary particles in the obtained active material powder for the positive electrode.

The initial discharge capacity at 25° C., 2.75 to 4.5 V, and a discharge rate of 0.5 C was 189.7 mAh/g, and the average voltage was 4.01 V. The capacity retention after 50 charge-discharge cycles was 93.2%. The heat generation starting temperature of the 4.3-V charged material was 174° C.

Example 3

An active material for a positive electrode was synthesized in the same manner as in Example 1 except that silicon dioxide powder was used in place of tungsten oxide, and composition analysis, property measurement, and battery performance test were conducted. As a result, the composition was LiCo$_{0.99}$Mg$_{0.005}$Si$_{0.005}$O$_2$.

The specific surface area of the powder after firing measured by a nitrogen adsorption method was 0.36 m$^2$/g, and the average particle diameter D50 measured by a laser scattering type particle size distribution analyzer was 15.2 μm. Magnesium and silicon were present on the surface. As a result of observation through SEM, 10 or more primary particles were aggregated to form secondary particles in the obtained active material powder for the positive electrode.

The initial discharge capacity at 25° C., 2.75 to 4.5 V, and a discharge rate of 0.5 C was 190.7 mAh/g, and the average voltage was 3.99 V. The capacity retention after 50 charge-discharge cycles was 90.0%.

Comparative Example 1

An active material for a positive electrode was synthesized in the same manner as in Example 1 except that magnesium hydroxide and tungsten oxide were not used, and composition analysis, property measurement, and battery performance test were conducted. As a result, the composition was LiCoO$_2$.

The specific surface area of the powder after firing measured by a nitrogen adsorption method was 0.32 m$^2$/g, and the average particle diameter D50 measured by a laser scattering type particle size distribution analyzer was 13.3 μm.

The initial discharge capacity at 25° C., 2.75 to 4.5 V, and a discharge rate of 0.5 C was 194.5 mAh/g, and the average voltage was 4.01 V. The capacity retention after 50 charge-discharge cycles was 74.4%. The heat generation starting temperature of the 4.3-V charged product was 163° C.

Comparative Example 2

An active material for a positive electrode was synthesized in the same manner as in Example 1 except that magnesium hydroxide was not used, and composition analysis, property measurement, and battery performance test were conducted. As a result, the composition was LiCo$_{0.99}$W$_{0.01}$O$_2$.

The specific surface area of the powder after firing measured by a nitrogen adsorption method was 0.66 m$^2$/g, and the average particle diameter D50 measured by a laser scattering type particle size distribution analyzer was 13.81 μm. Tungsten was present on the surface.

The initial discharge capacity at 25° C., 2.75 to 4.5 V and a discharge rate of 0.5 C was 184.6 mAh/g, and the average voltage was 4.02 V. The capacity retention after 50 charge-discharge cycles was 80.7%.

Figure 2:
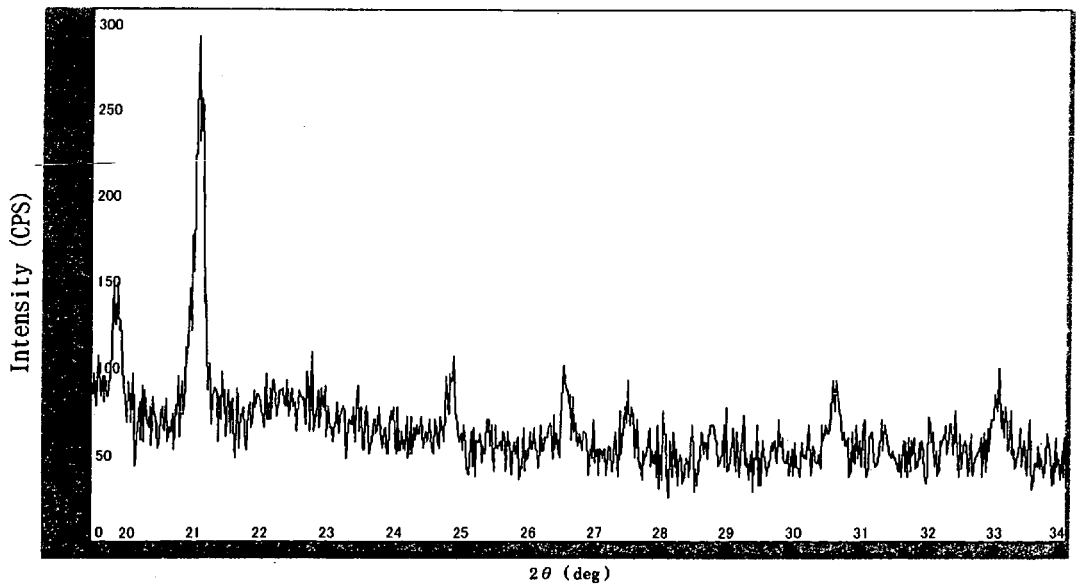
FIG. 2 is X-ray diffraction spectra of the powder of the positive electrode material obtained in Comparative Example 2.

In the same manner as in Example 1, X-ray diffraction spectra of the powder after firing was obtained by a high-sensitivity X-ray diffraction method using Cu—Kα. The obtained spectrum is shown in FIG. 2. From FIG. 2, diffraction spectrum was markedly observed within the range of 2 θ=21±1°, and it was known that about 40% of tungsten is present as a single oxide. It was also known from the analysis of the X-ray diffraction spectrum that about 50% of tungsten formed a solid solution with cobalt, and about 10% was present as Li$_2$WO$_4$.

Comparative Example 3

An active material for a positive electrode was synthesized in the same manner as in Example 3 except that magnesium hydroxide was not used, and composition analysis, property measurement, and battery performance test were conducted. As a result, the composition was LiCo$_{0.99}$Si$_{0.01}$O$_2$.

The specific surface area of the powder after firing measured by a nitrogen adsorption method was 0.41 m$^2$/g, and the average particle diameter D50 measured by a laser scattering type particle size distribution analyzer was 14.2 μm. Silicon was present on the surface.

The initial discharge capacity at 25° C., 2.75 to 4.5 V, and a discharge rate of 0.5 C was 193.3 mAh/g, and the average voltage was 4.01 V. The capacity retention after 50 charge-discharge cycles was 64.4%.

Comparative Example 4

An active material for a positive electrode was synthesized in the same manner as in Example 1 except that tungsten oxide was not used, and composition analysis, property measurement, and battery performance test were conducted. As a result, the composition was $LiC_{0.99}Mg_{0.01}O_2$.

The specific surface area of the powder after firing measured by a nitrogen adsorption method was 0.29 m²/g, and the average particle diameter D50 measured by a laser scattering type particle size distribution analyzer was 13.3 μm. Magnesium was present on the surface.

The initial discharge capacity at 25° C., 2.75 to 4.5 V, and a discharge rate of 0.5 C was 190.1 mAh/g, and the average voltage was 3.980 V. The capacity retention after 50 charge-discharge cycles was 74.7%.

INDUSTRIAL APPLICABILITY

According to the present invention, as described above, an useful positive electrode material for a lithium secondary battery that has high cyclic durability and high safety at high-voltage and high-capacity usage is provided.

The invention claimed is:

1. A positive electrode material for a lithium secondary battery, comprising an active material including particles, each of the particles comprising a composition represented by a general formula, $Li_aCo_bMg_cA_dO_eF_f$, wherein the element A is tungsten or silicon, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$ and $0.0001 \leq c+d \leq 0.03$, and wherein the magnesium and the element A, or further fluorine are evenly present in a vicinity of a surface of said particle.

2. The positive electrode material for a lithium secondary battery according to claim 1, wherein at least a part of the magnesium or the element represented by said A contained the particles substitutes cobalt atom in said particles and forms a solid solution.

3. The positive electrode material for a lithium secondary battery according to claim 1, wherein the atomic ratio of said magnesium to said element A is $0.10 \leq c/d \leq 10.00$, and $0.0002 \leq c+d \leq 0.02$.

4. The positive electrode material for a lithium secondary battery according to claim 1, wherein said element A is silicon.

5. The positive electrode material for a lithium secondary battery according to claim 1, wherein a quantity of the single oxide of said element A present in said active material for the positive electrode is 20% or less.

6. The positive electrode material for a lithium secondary battery according to claim 1, wherein 10 or more particles are aggregated each other to form secondary particles, and an average particle diameter of said secondary particles is 2 to 20 μm.

7. The positive electrode material for a lithium secondary battery according to claim 1, wherein $0 < f \leq 0.02$.

8. A positive electrode material for a lithium secondary battery wherein an active material for a positive electrode consists of a particle having a composition represented by a general formula, $Li_aCo_bMg_cA_dO_eF_f$, wherein the element A is tungsten, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$ and $0.0001 \leq c+d \leq 0.03$, and wherein the magnesium and the element A, or further fluorine are evenly present in a vicinity of a surface of said particle, and no diffraction peaks are observed within a range of $2\theta = 21 \pm 1°$ in the high-sensitivity X-ray diffraction spectrum using Cu—Kα.

9. A method for manufacturing a positive electrode material for a lithium secondary battery, comprising:

preparing an active material including primary particles, each of the particles comprising a composition represented by a general formula, $Li_aCo_bMg_cA_dO_eF_f$, wherein the element A is tungsten or silicon, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$ and $0.0001 \leq c+d \leq 0.03$, and wherein the magnesium and the element A, or further fluorine is evenly present in the vicinity of a surface of said particles, and mixing a cobalt material containing at least either cobalt oxyhydroxide or cobalt hydroxide, lithium carbonate, and a material containing magnesium, said element A or fluorine and firing the mixture, wherein the positive electrode material comprises secondary particles, each comprising 10 or more said primary particles.

10. The method for manufacturing a positive electrode material according to claim 8, wherein $0 < f \leq 0.02$.

* * * * *